United States Patent [19]
Powell et al.

[11] 3,814,161
[45] June 4, 1974

[54] PNEUMATIC TIRE
[75] Inventors: Leslie Vernon Powell, Lichfield; Reginald Harold Edwards, Sutton Coldfield, both of England
[73] Assignee: Dunlop Holdings Limited, London, England
[22] Filed: June 7, 1971
[21] Appl. No.: 150,564

[30] Foreign Application Priority Data
June 20, 1970   Great Britain................. 30031/70

[52] U.S. Cl............. 152/352, 152/330, 152/353, 152/355, 152/374
[51] Int. Cl...... B60c 5/00, B60c 13/00, B60c 19/00
[58] Field of Search.......... 152/330, 352, 354, 355, 152/362, 353, 357, 359, 374, 209 R

[56] References Cited
UNITED STATES PATENTS

| | | | |
|---|---|---|---|
| 3,115,921 | 12/1963 | Leibee | 152/352 |
| 3,392,772 | 7/1968 | Powers | 152/352 |
| 3,394,751 | 7/1968 | Sidles et al. | 152/352 |
| 3,421,566 | 1/1969 | Sidles et al. | 152/352 |
| 3,495,645 | 2/1970 | Gough | 152/330 |
| 3,610,310 | 10/1971 | Wittneben | 152/352 |

*Primary Examiner*—Drayton E. Hoffman

[57] ABSTRACT

A pneumatic tire having in the region of the sidewalls adjacent to the tread an annular layer of rubber, in addition to the normal sidewall rubber, the annular layer having a substantially triangular cross section. The width of the triangle base is between 5 and 12 times the maximum height of the annular layer. The layer can be on the inside or the outside of the sidewall, of which the following is a specification.

11 Claims, 1 Drawing Figure

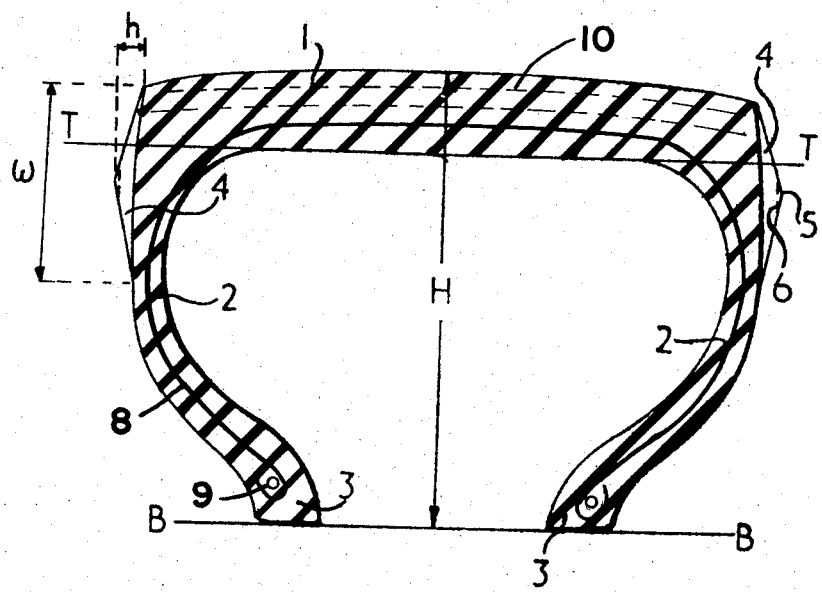

PNEUMATIC TIRE

This invention relates to pneumatic tires and, in particular to tires normally to be used on metalled road surfaces.

When a pneumatic tire is punctured, loss of air can occur to the extent that opposite interior walls of the tire come into contact with high localized deflection in the tire/ground contact area and the tire adjacent to the contact patch is severely flexed and buckled. This creates very high stress in the rubber and the reinforcing materials within the tire and can lead to tire failure, e.g. fatigue, in particular since there are flexing movements in the tire of very great amplitude which are repeated during each rotation of the tire.

According to the present invention there is provided a pneumatic tire comprising a reinforced carcass, having beads and sidewalls, and a tread portion having a substantially flat ground contacting surface, said tire having in the region of each of the sidewalls adjacent to the tread an annular layer of rubber in addition to the rubber of the sidewall, the layer of rubber having a transverse cross-section of substantially triangular form, the width of the triangle base being between 5 and 12 times the maximum height of the annular layer.

The apex of the annular layer is preferably located between 1 percent and 15 percent of the maximum tire section height radially inwards from a plane which is tangential to the inside surface of the tire at the point of maximum diameter when the tire is inflated and mounted on a wheel rim, and parallel to the plane from bead toe to bead toe. The apex of the triangle may be rounded or slightly flattened e.g. to a flat surface whose width may be up to one-fifth of the width of the base. In this case the position of the apex is taken to be that which would be its position if there were a sharp apex.

The triangular layer is preferably located on the outer surface of the sidewall although it may be located inwardly i.e., on the inner liner side.

The triangular form may be isosceles, this configuration providing the maximum bending stiffness for a minimum volume of rubber and a shape convenient from the manufacturing standpoint. When the triangular layer is located on the outer surface of the sidewall the disposition of the triangular form preferably is with the base of the triangle disposed nearest to the carcass reinforcement.

The sidewall of the tire is considered, in this specification, to be that portion of the tire which extends from the edge of the tread which forms the limit of the ground contacting surface to the position on the tire corresponding to the radially outer limit of the flange of the wheel to which the tire is designed to be fitted.

In a tire in accordance with the invention, the provision of the layer of triangular cross-section serves to reduce the very high stress in the rubber and the reinforcing material within the tire under deflated running conditions, compared with tires having no such layer, by the distribution of the strains in the structure. Thus early structural failure can be avoided and a deflated tire according to the invention may be driven an increased distance compared with a conventional tire not in accordance with the invention, without serious damage, a replacement tire and wheel assembly eventually being fitted.

This invention is applicable in particular to tires having breaker assemblies and having carcasses of radial cords but can be applied to carcasses of cross-bias cords. Since the tire is designed to be run under deflated conditions the aspect ratio of the tire is preferably low, e.g. between 30 and 75 per cent and especially between 55 and 70 per cent, and the width of the tread of the tire is preferably greater than the width between flanges of the rim of the wheel for which the tire is designed. The present invention may be used in conjunction with Ser. Nos. 154,326 filed June 18, 1971; 150,558 filed June 7, 1971; 150,627 filed June 7, 1971; 150,562 filed June 7, 1971; and 150,628 filed June 7, 1971.

The invention applies to tire and wheel assemblies in which the tire can be removed from the rim, or alternatively, when the tire is not removable therefrom, i.e., the two form a permanent assembly, for example, when the rim is swaged over the tire beads after assembly of tire and rim.

A tire in accordance with the invention will now be described by way of example only with reference to the accompanying drawing which is a sectional view of the tire in the inflated state.

The tire consists of a tread portion 1, having a substantially flat ground contacting surface, sidewall portions 2 and beads 3.

On the outer surface of the sidewall 2 is located an annular layer 4 of rubber of triangular cross-section. The height $h$ of the triangle is approximately 1/10 of the width of its base $w$.

The apex 5 of the triangle is positioned radially inwardly of the plane T—T by an amount which is approximately 7.5 percent of the maximum section height H of the tire. The plane T—T is tangential to the inner surface of the tire at the point of maximum height and is parallel to the plane B—B passing through the bead toes.

In an alternative arrangement the apex 5 of the triangle may be flattened slightly to a flat surface 6 shown in dotted lines on the drawing. The surface 6 has a width which is approximately one-fifth of the width of the base of the triangle.

The layer of rubber 4 may be made of a rubber compound having a comparatively low hardness e.g. 40° to 60° B.S.I., which may be softer than the sidewall and will generally be softer than the tread rubber.

Preferably the outer surfaces of the layer 4 is devoid of deep circumferential grooves or any other such pattern features which may lead to concentration of stresses in that region during flexing of the tire when running in a deflated or substantially under-inflated condition. The tire may be provided with radial cords 8 wrapped about bead wires 9. The tire may also have one or more breaker layers 10 beneath the tread portion.

Having now described our invention what we claim is:

1. A pneumatic tire comprising a reinforced carcass, having beads and sidewalls, and a tread portion having a substantially flat ground contacting surface, said tire having in the region of each of the sidewalls adjacent to the tread on the outside of the sidewall an annular layer of rubber in addition to the rubber of the sidewall, the layer of rubber having a transverse cross-section of substantially triangular form, the width of the triangle base being between 5 and 12 times the maximum height to the apex of the triangle, the base of the triangle being disposed nearest to the carcass reinforcement.

2. A tyre according to claim 1 in which the apex of the annular layer is located between 1 percent and 15 percent of the maximum tire section height radially inwards from a plane which is tangential to the inside surface of the tire at the point of maximum diameter when the tire is inflated and mounted on a wheel rim said plane being parallel to the plane from bead toe to bead toe.

3. A tire according to claim 1 in which the apex of the triangle is flattened to a flat surface whose width is not greater than one-fifth of the width of the base of the triangle.

4. A tire according to claim 1 in which the triangular form of the cross-section of said annular layer is isosceles.

5. A tire according to claim 1 in which the outer surface of the annular layer of rubber is devoid of deep circumferential grooves or any other such pattern features which lead to concentration of stress in that region during flexing of the tire when running in a deflated or substantially under-inflated condition.

6. A pneumatic tire according to claim 1 having a breaker assembly beneath said tread portion.

7. A tire according to claim 6 in which the carcass reinforcement comprises radial cords.

8. A tire according to claim 1 having an aspect ratio between 30 and 75 per cent.

9. A tire according to claim 8 in which the aspect ratio is between 55 and 70 per cent.

10. A tire according to claim 1 in which the width of the tread of the tire is greater than the width between flanges of the rim of the wheel for which the tire is designed.

11. A tyre according to claim 1 in which the annular layer of rubber of triangular cross-section is made of a rubber compound having a hardness between 40° and 20 B.S.I.

* * * * *